United States Patent [19]
Dietrich et al.

[11] Patent Number: 6,107,359
[45] Date of Patent: *Aug. 22, 2000

[54] POLYETHER POLYOLS, POLYOL FORMULATION CONTAINING THEM AND THEIR USE IN THE PRODUCTION OF HARD POLYURETHANE FOAMS

[75] Inventors: Karl-Werner Dietrich, Odenthal; Manfred Dietrich, Leverkusen, both of Germany; Wilhelm Lamberts, Sao Paulo-SP, Brazil; Walter Klän, Leverkusen, Germany

[73] Assignee: Bayer Aktiengesellschaft, Leverkusen, Germany

[*] Notice: This patent is subject to a terminal disclaimer.

[21] Appl. No.: 09/170,499

[22] Filed: Oct. 13, 1998

Related U.S. Application Data

[63] Continuation-in-part of application No. 08/875,805, Jul. 15, 1997, Pat. No. 5,840,781, which is a continuation of application No. PCT/EP96/00140, Jan. 15, 1996.

[30] Foreign Application Priority Data

Jan. 27, 1995 [DE] Germany .............. 195 02 578

[51] Int. Cl.$^7$ ................................. C08G 18/48
[52] U.S. Cl. ............ 521/167; 521/131; 252/182.25; 252/182.26; 528/421; 564/443
[58] Field of Search ..................... 521/167, 131; 252/182.25, 182.26; 528/421; 564/443

[56] References Cited

U.S. PATENT DOCUMENTS

| | | | |
|---|---|---|---|
| Re. 33,290 | 8/1990 | Naka et al. | 521/110 |
| 4,904,707 | 2/1990 | Lunney | 521/164 |
| 4,970,018 | 11/1990 | Lunney | 252/182.25 |
| 5,260,347 | 11/1993 | Krueger et al. | 521/164 |
| 5,461,084 | 10/1995 | Doerge | 521/167 |
| 5,583,197 | 12/1996 | Harrison et al. | 521/99 |

FOREIGN PATENT DOCUMENTS 495134  7/1992  European Pat. Off. .

*Primary Examiner*—Rachel Gorr
*Attorney, Agent, or Firm*—Joseph C. Gil; Lyndanne M. Whalen

[57] ABSTRACT

Polyol formulations, containing polyether polyols possessing 40 to 80 wt. % of tertiary amino groups and having an OH number of 300 to 500, preferably 350 to 420, obtainable by addition of exclusively propylene oxide to o-toluene diamine, which contain cyclopentane and/or n- and/or i-pentane and/or hydrofluoroalkanes as blowing agent, are used for the manufacture of rigid polyurethane foams by reacting with organic polyisocyanates, optionally further compounds with at least two hydrogen atoms reactive to isocyanates, optionally in the presence of water, and further blowing agents known per se as well as conventional auxiliaries and additives.

9 Claims, No Drawings

6,107,359

POLYETHER POLYOLS, POLYOL FORMULATION CONTAINING THEM AND THEIR USE IN THE PRODUCTION OF HARD POLYURETHANE FOAMS

This application is a Continuation-In-Part application of U.S. Ser. No. 08/875,805 now U.S. Pat. No. 5,840,781, filed Jul. 15, 1997, which is a continuation of PCT/EP96/00140 filed Jan. 15, 1996.

BACKGROUND OF THE INVENTION

It is known to manufacture rigid PUR foams using readily volatile alkanes and hydro-fluoro alkanes as blowing agents. The range of polyols is generally restricted in this case due to the low solubility of the above-mentioned blowing agents in most commercially available polyols and polyol mixtures. There are admittedly some polyol types with good solubility; trimethylolpropane- and ethylenediamine-started polyethers can be mentioned in particular here. In the case of trimethylolpropane ethers, the low functionality has a disadvantageous effect on the mold retention time (curing of the foams obtained), while with higher concentrations of ethylenediamine-started polyethers an excessively high inherent activity of the foam formulation is obtained.

DETAILED DESCRIPTION OF THE INVENTION

It has now been found that propylene oxide polyethers started on o-toluylenediamine on the one hand produce foams with satisfactory curing and on the other also possess a sufficiently low inherent activity, so that they can be added in sufficient concentration to the formulation as is necessary for the solubility of alkanes and hydro-fluoro alkanes.

It has also been shown that the o-toluene diamine-started polyethers are distinguished by a relatively low viscosity. It has furthermore been noted that relatively low-viscosity polyols can be obtained if the toluene diamine is first of all reacted with from about 2.5 to about 3.5 mol, preferably from about 2.75 to about 3.3 mol, most preferably about 3 mol of propylene oxide and then the desired OH number is set after the addition of an alkaline catalyst and further amounts of propylene oxide.

Polyols are thus obtained which are harmoniously attuned as regards solubility in the blowing agents to be used according to the invention, viscosity, inherent activity, influence on the flow properties of the rigid foams and a short mold retention time.

The invention provides polyether polyols possessing tertiary amino groups and having an OH number of 300 to 500, preferably 350 to 420, obtainable by the addition of exclusively propylene oxide to o-toluene diamine, a method for the manufacture of such polyether polyols, characterized in that o-toluene diamine is reacted first of all with from about 2.5 to about 3.5 mols, preferably from about 2.75 to about 3.3 mols, most preferably about 3 mols of propylene oxide and then after the addition of an alkali catalyst with further amounts of propylene oxide, until an OH number of 300 to 500, preferably 350 to 420, has been reached, and a polyol formulation for rigid polyurethane foams, containing 40 to 80 wt. % of the above-mentioned polyether polyols possessing tertiary amino groups.

Preferred is:

an above-mentioned polyol formulation, containing additionally sucrose polyether polyols with an OH number of 350 to 500 or containing additionally a mixture of sucrose polyether polyols with an OH number of 350 to 500 and phthalic acid ester polyols, the above-mentioned polyol formulation, containing cyclopentane as blowing agent, the above-mentioned polyol formulation, containing n- and/or i-pentane as blowing agent and the above-mentioned polyol formulation, containing hydrofluoro alkanes such as 1,1,1,1,4,4,4-hexafluorobutane and/or 1,1,1,3,3-pentafluoropropane as blowing agent.

The invention also relates to the use of the above mentioned polyol formulations for the manufacture of rigid polyurethane foams by reacting with organic polyisocyanates, optionally further compounds with at least two hydrogen atoms reactive to isocyanates, optionally in the presence of water, and further blowing agents known per se as well as conventional auxiliaries and additives.

Use is made according to the invention for the manufacture of rigid polyurethane foams of:

1. The above-mentioned polyether polyols possessing tertiary amino groups and having an OH number of 300 to 500, preferably 350 to 420, obtainable by the addition of exclusively propylene oxide to o-toluene diamine. Their manufacture takes place, e.g., in such a way that o-toluene diamine is reacted first of all with from about 2.5 to about 3.5 mols, preferably from about 2.75 to about 3.3 mols, most preferably about 3 mols of propylene oxide and then after the addition of an alkali catalyst with further amounts of propylene oxide, until an OH number of 300 to 500, preferably 350 to 420, has been reached. For the manufacture of rigid polyurethane foams, they are generally used as a polyol formulation in which their content generally comes to 20 to 80 wt. %.

The polyol formulations often contain additionally sucrose polyether polyols having an OH number from 350 to 500 and/or phthalic acid ester polyols.

The polyol formulations also contain cyclopentane and/or n- and/or i-pentane and/or hydrofluoroalkanes such as 1,1,1,4,4,4-hexafluorobutane and/or 1,1,1,3,3-pentafluoropropane as blowing agent. Also possible, in the polyol formation, is the use on a proportionate basis (up to 40 wt %) of other compounds with at least two hydrogen atoms reactive to isocyanates and a molecular weight of 62 to 10,000, preferably polyols such as the polyethers and polyesters known, per se, as well as chain-extension and crosslinking agents (cf. DE-OS 2 832 253, pages 11 to 20).

Starting components for the manufacture of the rigid polyurethane foams are also:

2. Aliphatic, cycloaliphatic, araliphatic, aromatic and heterocyclic polyisocyanates, such as are described, e.g., by W. Siefken in "Justus Liebigs Annalen der Chemie", 562, pages 75 to 136, for example, those with the formula

$Q(NCO)_n$, in which n is 2 to 4, preferably 2 to 3, and

Q stands for an aliphatic hydrocarbon residue with 2 to 18, preferably 6 to 10, C-atoms, a cycloaliphatic hydrocarbon residue with 4 to 15, preferably 5 to 10, C-atoms, an aromatic hydrocarbon residue with 6 to 15, preferably 6 to 13, C-atoms or an araliphatic hydrocarbon residue with 8 to 15, preferably 8 to 13, C-atoms, e.g., polyisocyanates such as are described in DE-OS 2 832 253, pages 10 to 11.

Particularly preferred are generally the technically easily accessible polyisocyanates, e.g., the 2,4- and 2,6-toluene diisocyanate and any mixtures of these isomers ("TDI"), polyphenylpolymethylene polyisocyanates, such as are manufactured by aniline formaldehyde condensation and subsequent phosgenation ("crude MDI") and carbodiimide groups, urethane groups, allophanate groups, isocyanurate groups, polyisocyanates containing biuret groups or urea groups ("modified polyisocyanates"), in particular, polyisocyanates such as are derived from 2,4- and/or 2,6-toluene diisocyanate or from 4,4'- and/or 2,4'-diphenylmethanediisocyanate.

3. There are used as blowing agents n- and/or i-pentane and/or cyclopentane and/or hydrofluoroalkanes such as 1,1,1,4,4,4-hexafluorobutane and/or 1,1,1,3,3-pentafluoropropane.

Water and/or other readily volatile organic compounds can also be used as additional blowing agents.

4. Use is also made optionally of further auxiliaries and additives known per se, such as catalysts, emulsifiers, flame retardants and foam stabilizers.

Preferred as emulsifiers are those based on alkoxylated fatty acids and higher alcohols. There are considered as foam stabilizers in particular polyether siloxanes, in particular, water-soluble representatives. These compounds are in general composed in such a way that a copolymer of ethylene oxide and propylene oxide is linked to a polydimethyl siloxane residue. Such foam stabilizers are described, e.g., in U.S. Pat. Nos. 2,834,748; 2,917,480 and 3,629,308. The catalysts known, per se, from polyurethane chemistry such as tertiary amines and/or organometallic compounds can also be used.

Tricresyl phosphate, for example, may be mentioned as a flame retardant.

Reaction retardants, e.g., acid reacting substances such as hydrochloric acid or organic acid halides, also cell regulators of the kind known per se such as paraffins or fatty alcohols or dimethyl polysiloxanes as well as pigments or dyestuffs, also stabilizers against ageing and weathering influences, plasticizers and fungistatically and bacteriostatically acting substances as well as fillers such as barium sulphate, kieselguhr, carbon black or prepared chalks can also be used.

Further examples of surface-active additives are foam stabilizers as well as cell regulators, reaction retardants, stabilizers, flame-inhibiting substances, plasticizers, dyestuffs and fillers as well as fungistatically and bacteriostatically active substances which can be used optionally according to the invention, as well as details on method of use and mode of action of these additives, are described in "Kunststoff-Handbuch", Vol. VII, published by Vieweg and Höchtlen, Carl-Hanser-Verlag, Munich, 1966, e.g. on pages 103 to 113.

Carrying out of the invention:

The reaction components are reacted according to the invention by the single-stage method known, per se, as the prepolymer method or the semi-prepolymer method, wherein use is often made of mechanical equipment, e.g., that which is described in U.S. Pat. No. 2,764,565. Details of processing equipment which is also considered according to the invention are described in "Kunststoff-Handbuch", Vol. VII, published by Vieweg and Höchtlen, Carl-Hanser-Verlag, Munich, 1966, e.g., on pages 121 to 205.

Foams can naturally, however, also be manufactured by slabstock foaming or by the continuous laminator method known per se.

The rigid foams obtainable according to the invention are furthermore used, e.g., in the building trade and for the lagging of district heating pipes and containers.

A characteristic value range of 100 to 300, preferably 100 to 130, is generally worked with according to the invention.

For the manufacture of the foam, the foaming can also be carried out in closed molds according to the invention. For this, the reaction mixture is introduced into a mold. Metal, e.g., aluminum, or plastics material, e.g., epoxy resin, is considered as mold material.

In the mold, the foamable reaction mixture foams up and forms the molding. The mold foaming can be carried out in such a way that the molded part has a cellular structure on its surface. It can, however, also be carried out in such a way that the molded part has a compact skin and a cellular core. According to the invention, it is possible to proceed in this connection in such a way that an amount of foamable reaction mixture is introduced into the mold such that the foam formed just fills the mold. It is also possible to work, however, so that more foamable reaction mixture is introduced into the mold than is necessary for filling the mold interior with foam. In the last-mentioned case, "overcharging" is therefore practiced; such a method of operation is known, e.g., from U.S. Pat. Nos. 3,178,490 and 3,182,104.

Use is often also made for the mold foaming of "outer mold release agents" known, per se, such as silicone oils. So-called "inner mold release agents" can, however, also be used, optionally in a mixture with outer mold release agents, such as have become known, e.g., from DE-OS 2 121 670 and 2 307 589.

Chilling and refrigerating units are preferably foamed out according to the invention.

Embodiments:

I. Manufacture of o-toluene diamine (TDA)/propylene oxide polyethers

EXAMPLE A 19.6 kg of o-TDA, the mixture of 2,3- and 3,4-TDA obtained as by-product during the manufacture of TDA, are placed in a 100 l reactor suitable for reactions with alkylene oxides and 27.9 kg of propylene oxide (3 mol/mol TDA) are added within 2 hours after thorough washing with nitrogen at 110 to 125° C. and 2 to 3 bar nitrogen. After 2 hours, subsequent reaction and the addition of 600 g of 45% aqueous potassium hydroxide solution, 42.5 kg of propylene oxide are then incorporated. After a subsequent reaction time of 4 hours at 110 to 125° C., the alkaline polyether is neutralized with lactic acid. After the addition of 90 g of Ionol, small amounts of readily volatile components are removed under vacuum. 90 kg of a polyether with the following analytical data are obtained:

| OH number (ESA) | 403 |
|---|---|
| OH number (PSA) | 362 |
| η | 31,320 mPa · s/25° C. |

EXAMPLE B

The same amounts of TDA and propylene oxide are used as in Example A. In contrast to Example A, however, the preparation is catalyzed with only 400 g of 45% aqueous potassium hydroxide solution. The preparation is neutralized with acetic acid. After working up, 90 kg of a polyether with the following analytical data are obtained:

| OH number (ESA) | 389 |
|---|---|
| OH number (PSA) | 356 |
| η | 36,690 mPa · s/25° C. |

EXAMPLE C (Comparison)

19.6 kg of o-TDA are placed in a 100 l reactor and 32.6 kg of propylene oxide (3.5 mol/mol TDA) are added within 2.5 hours after thorough washing with nitrogen at 110 to 125° C. and 2 to 3 bar nitrogen. After 2 hours, subsequent reaction and the addition of 400 g of 45% aqueous potassium hydroxide solution, 37.8 kg of propylene oxide are then incorporated. After a subsequent reaction time of 4 hours at 110 to 125° C. the alkaline polyether is neutralized with lactic acid. After the addition of 90 g of lonol, small amounts of readily volatile components are removed under vacuum. A polyether with the following analytical data is obtained:

| | |
|---|---|
| OH number (ESA) | 398 |
| OH number (PSA) | 380 |
| η | 48,750 mPa · s/25° C. |

The OH values given have been determined both by the acetic anhydride (ESA) method and by the phthalic acid (PSA) method. The difference in the values of the two methods gives the content in secondary NH groups.

II. Manufacture of rigid PUR foams (PW=parts by weight)

EXAMPLE 1

Polyol component:

Mixture of 60 parts by wt. of a polyether polyol according to the invention with OH number (ESA) 403, manufactured by the polyaddition of 1,2-propylene oxide to o-toluene diamine according to Example A, 30 parts by wt. of a polyether polyol with hydroxyl number (ESA) 450, manufactured by the polyaddition of 1,2-propylene oxide to a mixture of sucrose and ethylene glycol, 10 parts by wt. of a phthalic acid/diethylene glycol ester ether with hydroxyl number (ESA) 300, 2 parts by wt. of water, 2 parts by wt. of a foam stabilizer on silicone base (Tegostab® B 8443), 1.2 parts by wt. of N,N-dimethylcyclohexylamine.

The polyol component dissolves 40 parts by weight of cyclopentane or >40 parts by wt. of 1,1,1,4,4,4-hexafluorobutane. The polyol component has a viscosity of 2500 mPa·s at 25° C. The core polyol has a calculated functionality of 3.4.

Isocyanate component:

Polymeric MDI (crude MDI), NCO content 31.5 wt. %.

Manufacture of rigid PUR foam:

100 parts by wt of the polyol component and 13 parts by wt. of cyclopentane are mixed by means of a laboratory stirrer (1000 rpm) at 20° C. 113 parts by wt. of this mixture are then stirred with 130 parts by wt. of the isocyanate component. A defined amount of the reaction mixture is poured into a mold with the dimensions 22×22×6 cm and foamed up into a compressed rigid foam slab. Several of these mouldings are manufactured and demolded after different times. When the molding has cooled, its irreversible swelling is determined.

EXAMPLE 2 (Comparative Example)

Polyol component:

Mixture of 60 parts by wt. of a polyether polyol with OH number (ESA) 400, manufactured by polyaddition of 1,2-propylene oxide to sucrose 30 parts by wt. of a polyether polyol with hydroxyl number (ESA) 450, manufactured by the polyaddition of 1,2-propylene oxide to a mixture of sucrose and ethylene glycol, 10 parts by wt of a phthalic acid-diethylene glycol ester ether with hydroxyl number (ESA) 300, 2 parts by wt. of water, 2 parts by wt. of a foam stabilizer on silicone base (Tegostab® B 8443), 2.6 parts by wt. of N,N-dimethylcyclohexylamine.

The polyol component dissolves 11 parts by wt. of cyclopentane or 7 parts by wt of 1,1,1,4,4,4-hexafluorobutane.

The polyol component has a viscosity of 2200 mPa·s at 25° C. The core polyol has a calculated functionality of 3.8. Tests with i-pentane or n-pentane as blowing agent did not produce a satisfactory solubility in the polyol component.

Isocyanate component:

Polymeric MDI (crude MDI), NCO content 31.5 wt. %.

Manufacture of a rigid PUR foam:

100 parts by wt of the polyol component and 13 parts by wt. of cyclopentane are mixed by means of a laboratory stirrer (1000 rpm) at 20° C. 113 parts by wt of this mixture are then stirred with 130 parts by wt. of the isocyanate component. A defined amount of the reaction mixture is poured into a mold with the dimensions 22×22×6 cm and foamed up into a compressed rigid foam slab. Several of these mouldings are manufactured and demolded after different times. When the molding has cooled, its irreversible swelling is determined.

EXAMPLE 3 (Comparative Example)

Polyol component:

Mixture of 60 parts by wt. of a polyether polyol with OH number (ESA) 400, manufactured by the polyaddition of 1,2-propylene oxide to trimethylolpropane, 30 parts by wt. of a polyether polyol with hydroxyl number (ESA) 450, manufactured by the polyaddition of 1,2-propylene oxide to a mixture of sucrose and ethylene glycol, 10 parts by wt. of a phthalic acid-diethylene glycol ester ether with hydroxyl number (ESA) 300, 2 parts by wt. of water, 2 parts by wt. of a foam stabilizer on silicone base (Tegostab® B 8443), 2.6 parts by wt. of N,N-dimethylcyclohexylamine.

The polyol component dissolves 29 parts by wt of cyclopentane, or 18 parts by wt. of 1,1,1,4,4,4-hexafluorobutane. The polyol component has a viscosity of 500 mPa·s at 25° C. The core polyol has a calculated functionality of 2.8. Tests with i-pentane and n-pentane as blowing agent did not produce a satisfactory solubility in the polyol component.

Isocyanate component:

Polymeric MDI (crude MDI), NCO content 31.5 wt. %.

Manufacture of a rigid PUR foam:

100 parts by wt. of the polyol component and 13 parts by wt. of cyclopentane are mixed by means of a laboratory stirrer (1000 rpm) at 20° C. 113 parts by wt. of this mixture are then stirred with 130 parts by wt. of the isocyanate component. A defined amount of the reaction mixture is poured into a mold with the dimensions 22×22×6 cm and foamed up into a compressed rigid foam slab. Several of these mouldings are manufactured and demolded after different times. When the molding has cooled, its irreversible swelling is determined.

The results of the mold retention time measurement for Examples 1 to 3 showed the following:

Whereas only small swell values were obtained for the formulation of Example 1 based on the o-toluene diamine-propylene oxide polyether according to the invention, the formulations of Examples 2 and 3 show far higher swell values.

Although the invention has been described in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded polyurethane foam comprising reacting
   a) an organic diisocyanate and/or polyisocyanate with
   b) a polyether polyol containing tertiary amino groups and having an OH number of from about 300 to about 500 produced by adding only propylene oxide to o-toluene diamine in the presence of
   c) a blowing agent selected from the group consisting of cyclopentane, n-pentane, isopentane and mixtures thereof in a mold.

2. The process of claim 1 in which polyether polyol b) has an OH number of from 350 to 420.

3. The process of claim 1 in which the reaction mixture further includes from 20 to 80% of a polyol other than polyether polyol b).

4. The process of claim 1 in which the reaction mixture further includes a sucrose-based polyether polyol having an OH number of from about 350 to about 500.

5. The process of claim 4 in which the reaction mixture further includes a phthalic acid ester polyol.

6. The process of claim 5 in which cyclopentane is included in the reaction mixture as a blowing agent.

7. The process of claim 5 in which n-pentane and/or isopentane is included in the reaction mixture as a blowing agent.

8. The process of claim 3 in which the reaction mixture includes cyclopentane as a blowing agent.

9. The process of claim 3 in which the reaction mixture includes n-pentane and/or isopentane as a blowing agent.

* * * * *